United States Patent
Liu

(10) Patent No.: US 10,466,943 B2
(45) Date of Patent: Nov. 5, 2019

(54) IMAGE PROCESSING APPARATUS, METHOD AND NON-TRANSITORY COMPUTER-READABLE RECORDING MEDIUM STORING INSTRUCTIONS THEREFOR

(71) Applicant: BROTHER KOGYO KABUSHIKI KAISHA, Nagoya, Aichi (JP)

(72) Inventor: Yuqing Liu, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/215,718

(22) Filed: Dec. 11, 2018

(65) Prior Publication Data

US 2019/0187945 A1     Jun. 20, 2019

(30) Foreign Application Priority Data

Dec. 20, 2017 (JP) .................................. 2017-243637

(51) Int. Cl.
G06F 3/12 (2006.01)
(52) U.S. Cl.
CPC .......... G06F 3/1238 (2013.01); G06F 3/1222 (2013.01); G06F 3/1288 (2013.01)
(58) Field of Classification Search
CPC ..... G06F 3/1238; G06F 3/1288; G06F 3/1222
USPC ....................................................... 358/1.15
See application file for complete search history.

(56) References Cited

U.S. PATENT DOCUMENTS

| 2007/0201084 A1* | 8/2007 | Tokumaru | H04W 12/06 |
| | | | 358/1.15 |
| 2010/0050247 A1 | 2/2010 | Hashimoto | |
| 2012/0272299 A1 | 10/2012 | Ikeuchi | |
| 2012/0323717 A1* | 12/2012 | Kirsch | G06Q 20/0855 |
| | | | 705/26.1 |

(Continued)

FOREIGN PATENT DOCUMENTS

| JP | 2008-033391 A | 2/2008 |
| JP | 2009-093626 A | 4/2009 |
| JP | 2012-226606 A | 11/2012 |

*Primary Examiner* — Allen H Nguyen
(74) *Attorney, Agent, or Firm* — Scully, Scott, Murphy & Presser, PC

(57) ABSTRACT

An image processing apparatus including a memory, a first communication interface configured to communicate with an authentication server, a second communication interface configured to receive terminal identifying information from an external device, a user interface, and a controller. The controller is configured to transmit the first authentication information to the authentication server and receive an authentication result. If the received authentication result indicates that authentication is successfully done, The controller switches a state of the image processing apparatus from a logged out state to a logged-in state. Further, the controller is configured to store terminal identifying information identifying the external device in the memory as corresponding information. In response to receiving the terminal identifying information, the controller performs authentication by collating the terminal identifying information and the corresponding information and switches the state of the image processing apparatus from the logged-out state to the logged-in state.

20 Claims, 8 Drawing Sheets

(56) References Cited

U.S. PATENT DOCUMENTS

2014/0313539 A1* 10/2014 Kawano .................. G06F 21/44
　　　　　　　　　　　　　　　　　　　　　　　358/1.14
2016/0004498 A1* 1/2016 Iwauchi ............. H04N 1/00251
　　　　　　　　　　　　　　　　　　　　　　　358/1.15

* cited by examiner

FIG. 2

```
┌─────────────────────────────────┐ ─80
│ SECURITY FUNCTION SETTING       │
│                                 │
│   ○ Off                         │
│   ○ FUNCTION RESTRICTION        │
│   ● AUTHENTICATION SERVER       │
│                                 │
└─────────────────────────────────┘
```

FIG. 3

| USER ID | PIN | CARD ID | EMAIL ADDRESS | AVAILABILITY | | |
|---------|-----|---------|---------------|--------------|---|---|
| | | | | PRINT | COPY | SCAN |
| USER A | 1234 | – | – | ○ | × | × |

| USER ID | PASSWORD | EMAIL ADDRESS |
|---------|----------|---------------|
| USER B | abcde | userB@### |

```
┌───────────────────────────────────────────┐ ─90
│ AUTHENTICATION SERVER SETTING             │
│                                           │
│   SERVER ADDRESS          [_____]  ─91 │
│   DOMAIN NAME             [_____]  ─92 │
│   REFFERENCE TO SERVER    ● ON  ○ OFF     │
│   AT REGISTRATION TIME                ─93 │
│   REFFERENCE TO SERVER    ● ON  ○ OFF ─94 │
│   AT AUTHENTICATION TIME                  │
│   ADMINISTRATOR ID        [_____]  ─95 │
│   ADMINISTRATOR PASSWORD  [_____]  ─96 │
└───────────────────────────────────────────┘
```

IMAGE PROCESSING APPARATUS, METHOD AND NON-TRANSITORY COMPUTER-READABLE RECORDING MEDIUM STORING INSTRUCTIONS THEREFOR

CROSS-REFERENCE TO RELATED APPLICATION

This application claims priority under 35 U.S.C. § 119 from Japanese Patent Application No. 2017-243637 filed on Dec. 20, 2017. The entire subject matter of the application is incorporated herein by reference.

BACKGROUND

Technical Field

The present disclosures relate to an image processing apparatus, method and non-transitory computer-readable recording medium storing instructions therefor.

Related Art

Conventionally, there has been known an image processing apparatus configured such that authentication is performed with use of an authentication server based on authentication information such as information stored in an IC card. For example, the image processing apparatus reads out card information from the IC card and transmits the same to the authentication server to request for authentication. When the authentication is done successfully, the image processing apparatus allows a user of the IC card to log in to the image processing apparatus.

SUMMARY

According to the conventional image processing apparatus, authentication by the authentication server using the authentication information such as information stored in the IC card can be done. However, in order for the authentication, it is necessary that a communication between the image processing apparatus and the authentication server is established.

According to aspects of the present disclosure, there is provided an image processing apparatus. An image processing apparatus includes a memory, a first communication interface configured to communicate with an authentication server storing a first database, first user identification information being registered with the first database in association with a first password, a second communication interface configured to receive terminal identifying information from an external device located within a particular range from the image processing apparatus, the terminal identifying information identifying the external device, a user interface, and a controller. The controller is configured to perform: in response to receipt, through the user interface, of first authentication information including the first user identification information and the first password while being in a logged-out state, a first authentication process of transmitting the first authentication information to the authentication server through the first communication interface and receiving an authentication result based on collation between the first authentication information and the first database, the logged-out state being a state in which the controller does not accept an execution instruction of an image processing operation; in response to receipt of an authentication result indicating that an authentication is successfully done in the first authentication process, a first login process of switching a state of the image processing apparatus from the logged out state to a logged-in state, the logged-in state being a state in which the controller accepts the execution instruction of the image processing operation; in response to receipt of the terminal identifying information through the second communication interface while being the logged-in state, a first registration process of storing the terminal identifying information in the memory as corresponding information, the terminal identifying information being associated, in the corresponding information, with the first user identification information included in the first authentication information; in response to receiving the terminal identifying information through the second communication interface while being in the logged-out state, a second authentication process of performing authentication by collating the terminal identifying information and the corresponding information stored in the memory, the second authentication process determining that the authentication is successfully done when the terminal identifying information is included in the received terminal identifying information; and in response to determining that the authentication is successfully done in the second authentication process, a second login process of switching the state of the image processing apparatus from the logged-out state to the logged-in state.

According to aspects of the present disclosure, there is provided a method of controlling an image processing apparatus. The image processing apparatus has a memory, a first communication interface configured to communicate with an authentication server storing a first database, first user identification information being registered with the first database, in association with a first password, a second communication interface configured to receive terminal identifying information from an external device located within a particular range from the image processing apparatus, the terminal identifying information identifying the external device, and a user interface. The method includes: receiving, through the user interface, first authentication information including the first user identification information and the first password while the image processing apparatus being in a logged-out state, the logged-out state being a state in which an execution instruction of an image processing operation is not acceptable; in response to receiving of the first authentication information while the image processing apparatus being in the logged-out state, performing a first authentication of transmitting the first authentication information to the authentication server through the first communication interface and receiving an authentication result based on collation between the first authentication information and the first database; in response to receiving an authentication result indicating that the first authentication is successfully done, switching a state of the image processing apparatus from the logged out state to the logged-in state, the logged-in state being a state in which the execution instruction of the image processing operation is acceptable; receiving the terminal identifying information through the second communication interface while the image processing apparatus being the logged-in state; in response to receiving the terminal identifying information through the second communication interface while the image processing apparatus being the logged-in state, storing the terminal identifying information in the memory as corresponding information, the terminal identifying information being associated, in the corresponding information, with the first user identification information included in the first authentication information; receiving the terminal identifying information through the second communication interface while the image processing apparatus being in the logged-out state; in response to receiving the terminal identifying information through the second communication interface while the image processing apparatus being in the logged-out state, performing second authentication by collating the terminal identifying information and the corresponding information stored in the memory, the second authentication being determined to be successfully done when the terminal identifying information is included in the received terminal identifying information; and, in response to determining that the second authentication is successfully done, switching the state of the image processing apparatus from the logged-out state to the logged-in state.

According to aspects of the present disclosure, there is provided a non-transitory computer-readable medium storing computer-readable instructions executable by a controller of an image processing apparatus. The image processing apparatus has a memory, a first communication interface configured to communicate with an authentication server storing a first database, first user identification information being registered with the first data base in association with a first password, a second communication interface configured to receive terminal identifying information from an external device located within a particular range from the image processing apparatus, the terminal identifying information identifying the external device, and a user interface. The instructions causing, when executed, the controller to perform: in response to receipt, through the user interface, of first authentication information including the first user identification information and the first password while being in a logged-out state, a first authentication process of transmitting the first authentication information to the authentication server through the first communication interface and receiving an authentication result based on collation between the first authentication information and the first database, the logged-out state being a state in which the controller does not accept an execution instruction of an image processing operation; in response to receipt of an authentication result indicating that an authentication in the first authentication process, a first login process of switching a state of the image processing apparatus from the logged out state to a logged-in state in which the controller accepts the execution instruction of the image processing operation; in response to receipt of the terminal identifying information through the second communication interface while being the logged-in state, a first registration process of storing the terminal identifying information in the memory as corresponding information, the terminal identifying information being associated, in the corresponding information, with the first user identification information included in the first authentication information; in response to receiving the terminal identifying information through the second communication interface while being in the logged-out state, a second authentication process of performing authentication by collating the terminal identifying information and the corresponding information stored in the memory, the second authentication process determining that the authentication is successfully done when the terminal identifying information is included in the received terminal identifying information; and, in response to determining that the authentication is successfully done in the second authentication process, a second login process of switching the state of the image processing apparatus from the logged-out state to the logged-in state.

BRIEF DESCRIPTION OF THE ACCOMPANYING DRAWINGS

FIG. 2 shows an example of a security function setting screen.

FIG. 3 schematically shows a data structure of a function restriction database.

FIG. 4 schematically shows a data structure of an authentication database.

FIG. 5 shows an example of an authentication server setting screen.

Figure 6:
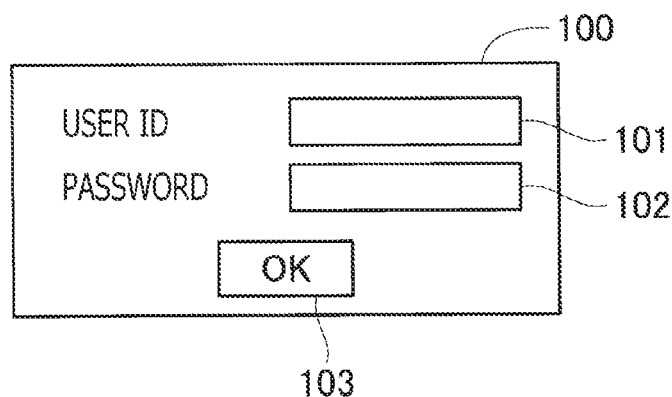

FIG. 6 shows an example of a lock screen.

Figure 7:
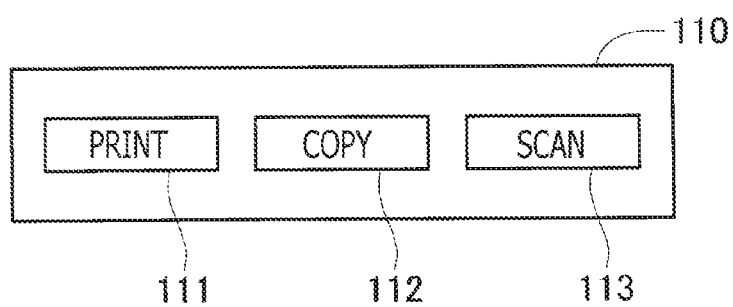

FIG. 7 shows an example of a standby screen.

Figure 8:
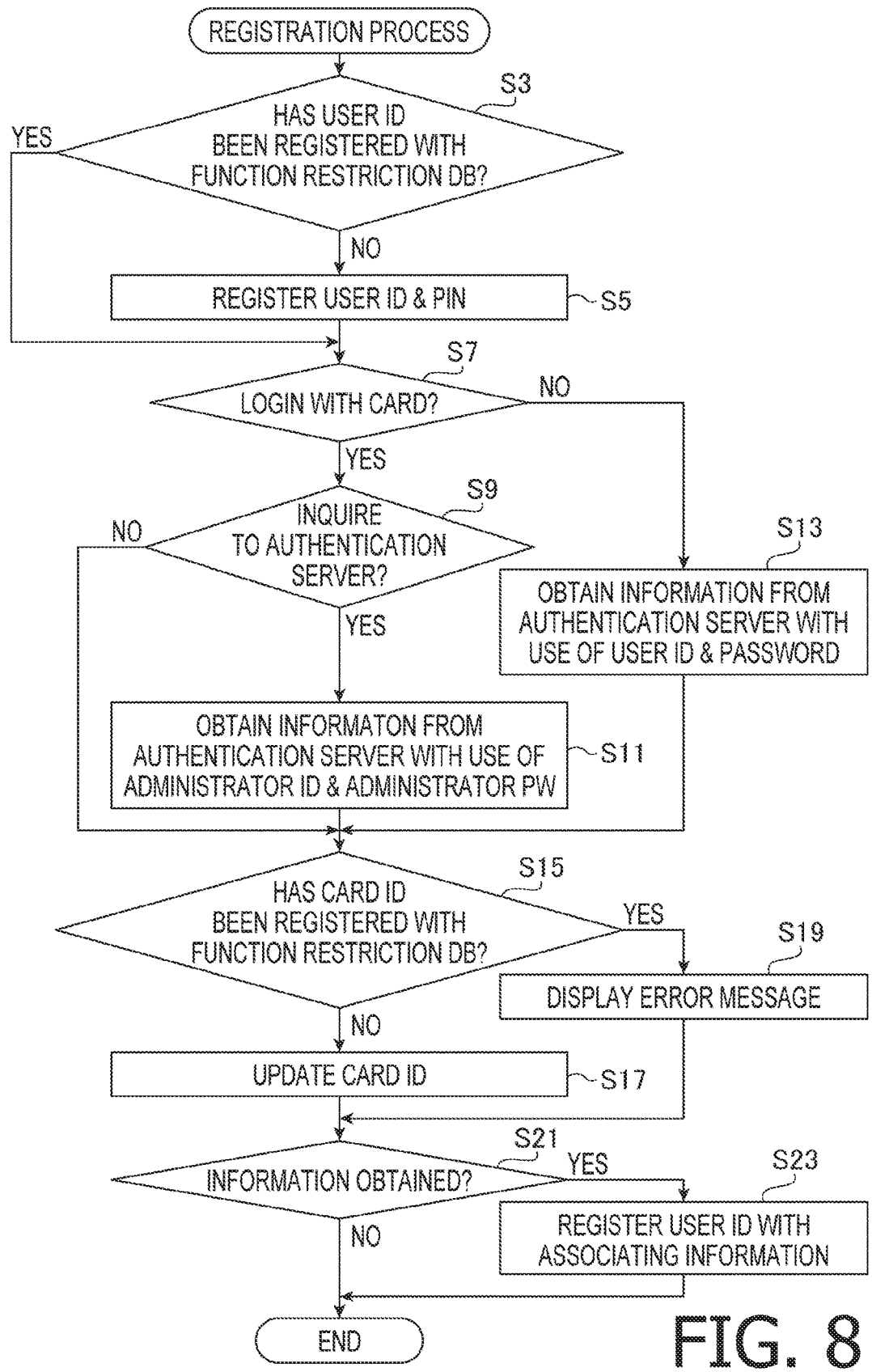

FIG. 8 is a flowchart illustrating a registration process according to a first embodiment of the present disclosures.

Figure 9:
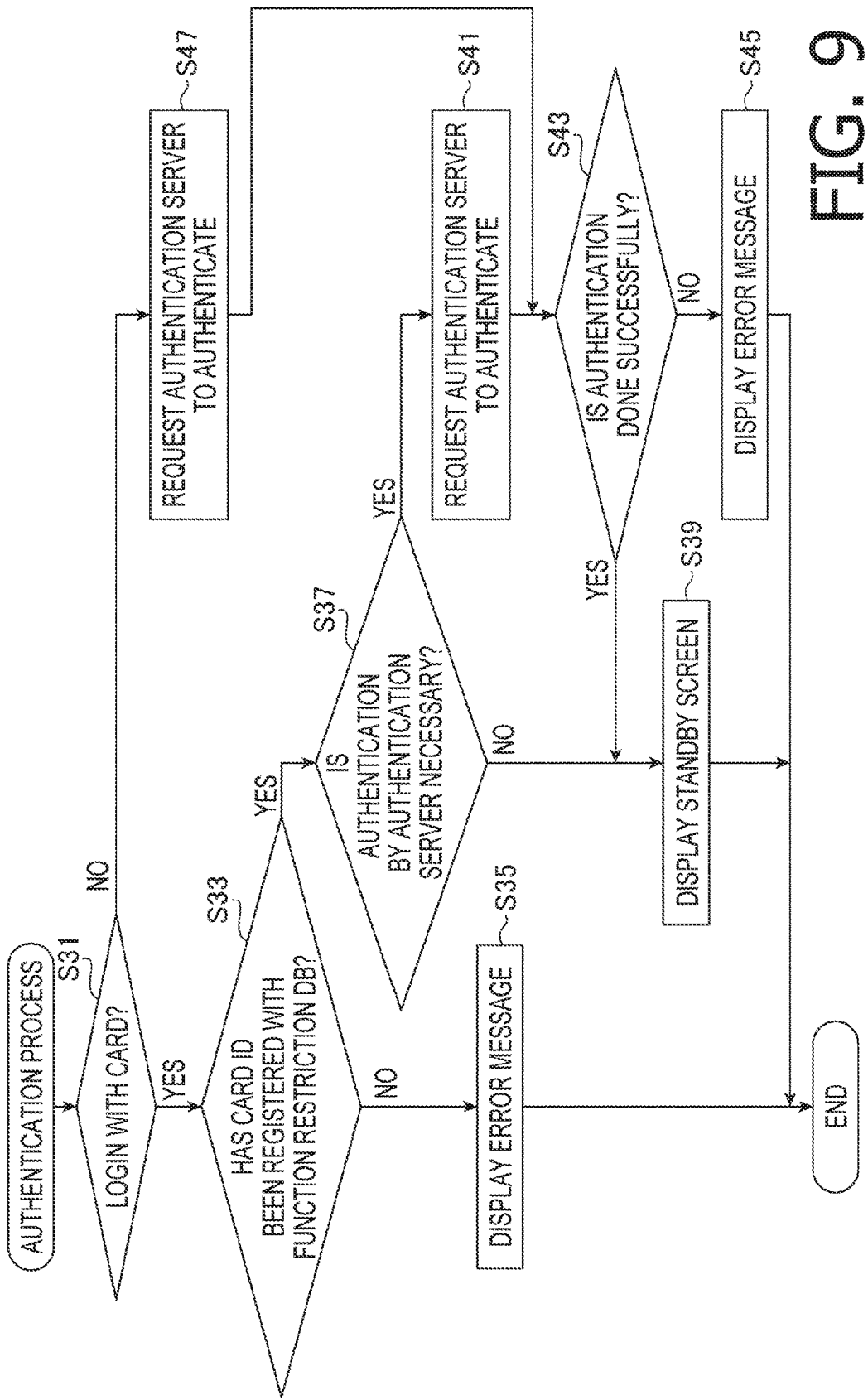

FIG. 9 is a flowchart illustrating an authentication process.

Figure 10:
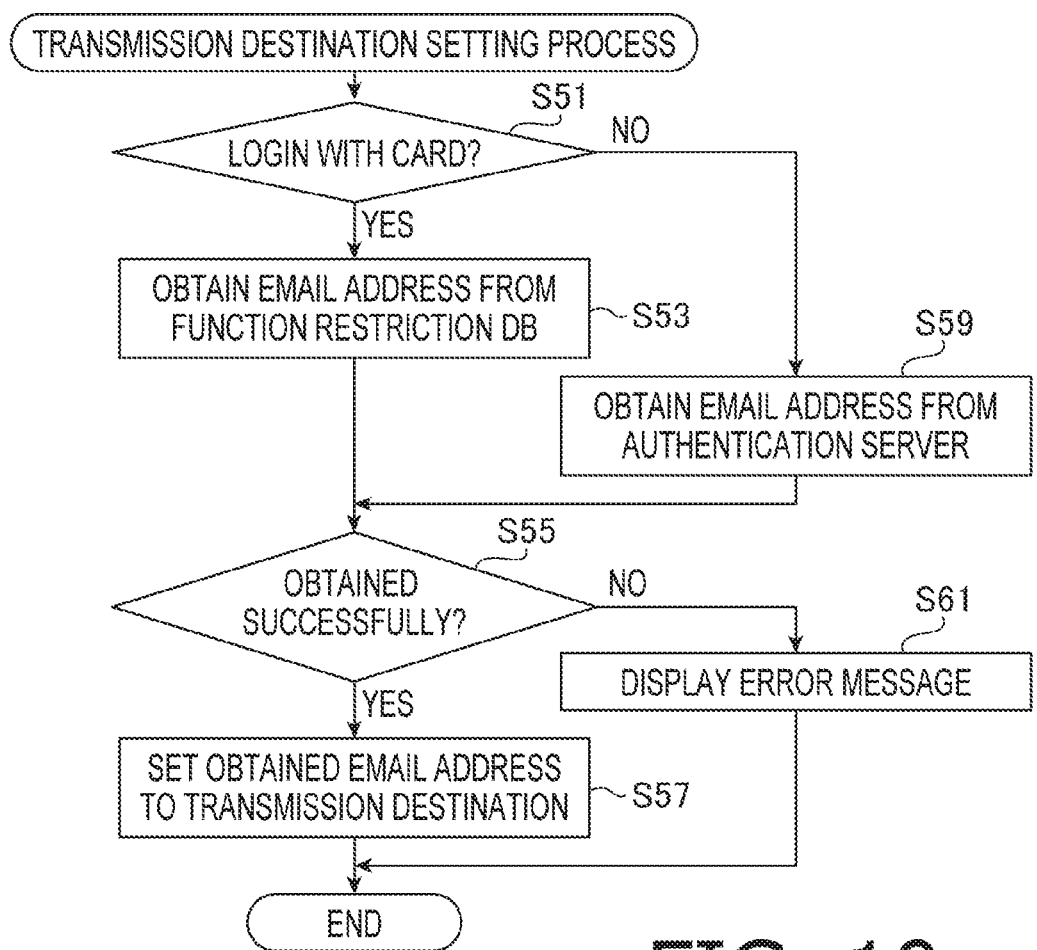

FIG. 10 is a flowchart illustrating a transmission destination setting process.

Figure 11A:
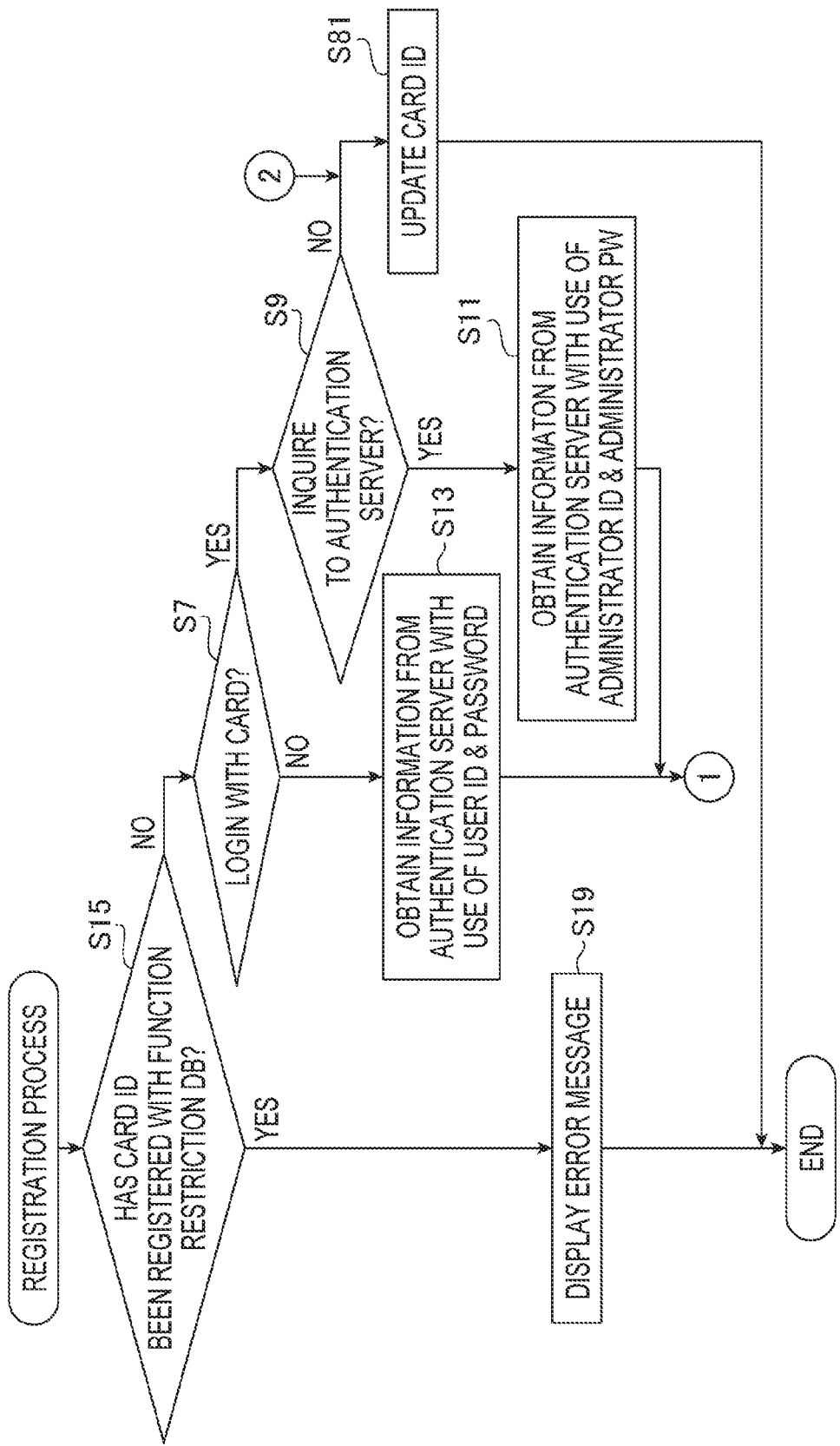
Figure 11B:
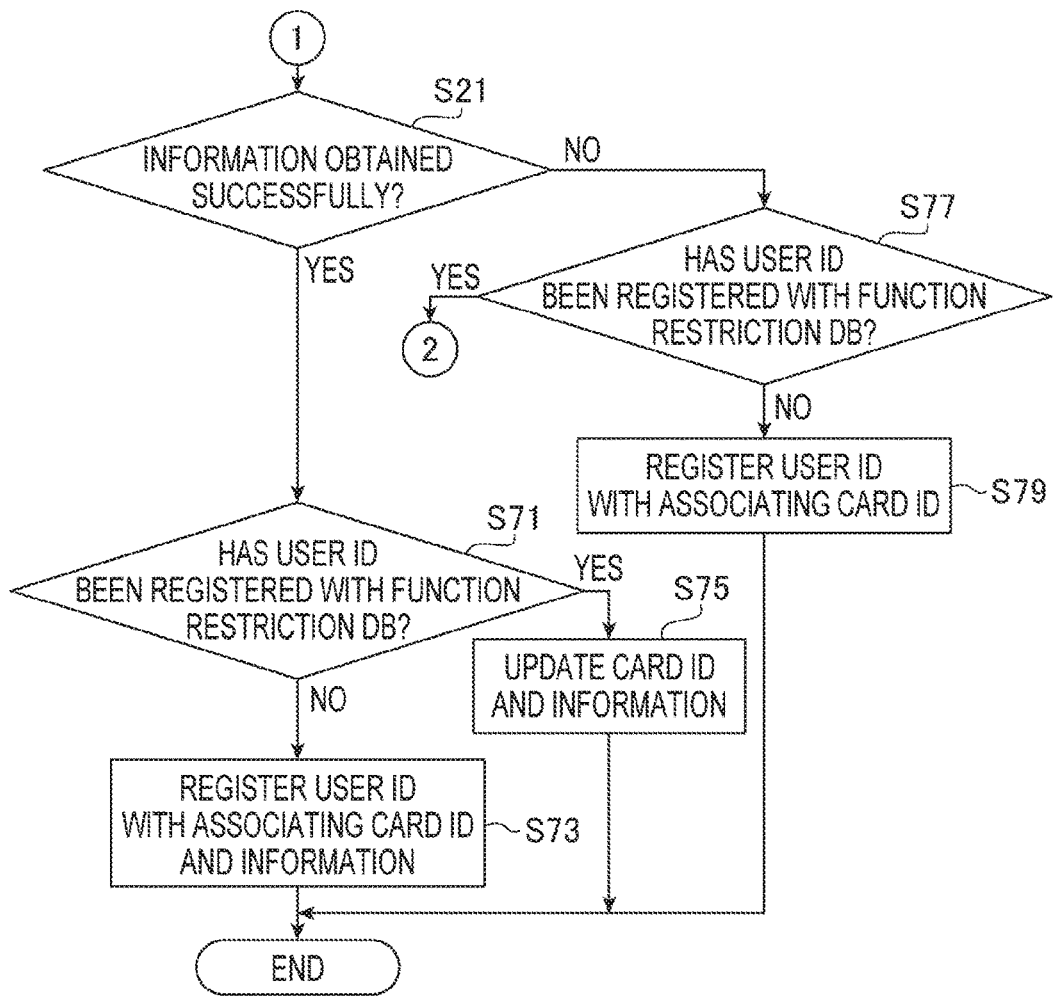

FIGS. 11A and 11B are a flowchart illustrating a registration process according to a second embodiment of the present disclosures.

DETAILED DESCRIPTION OF THE EMBODIMENTS

First Embodiment

Configuration of Image Processing System

Figure 1:
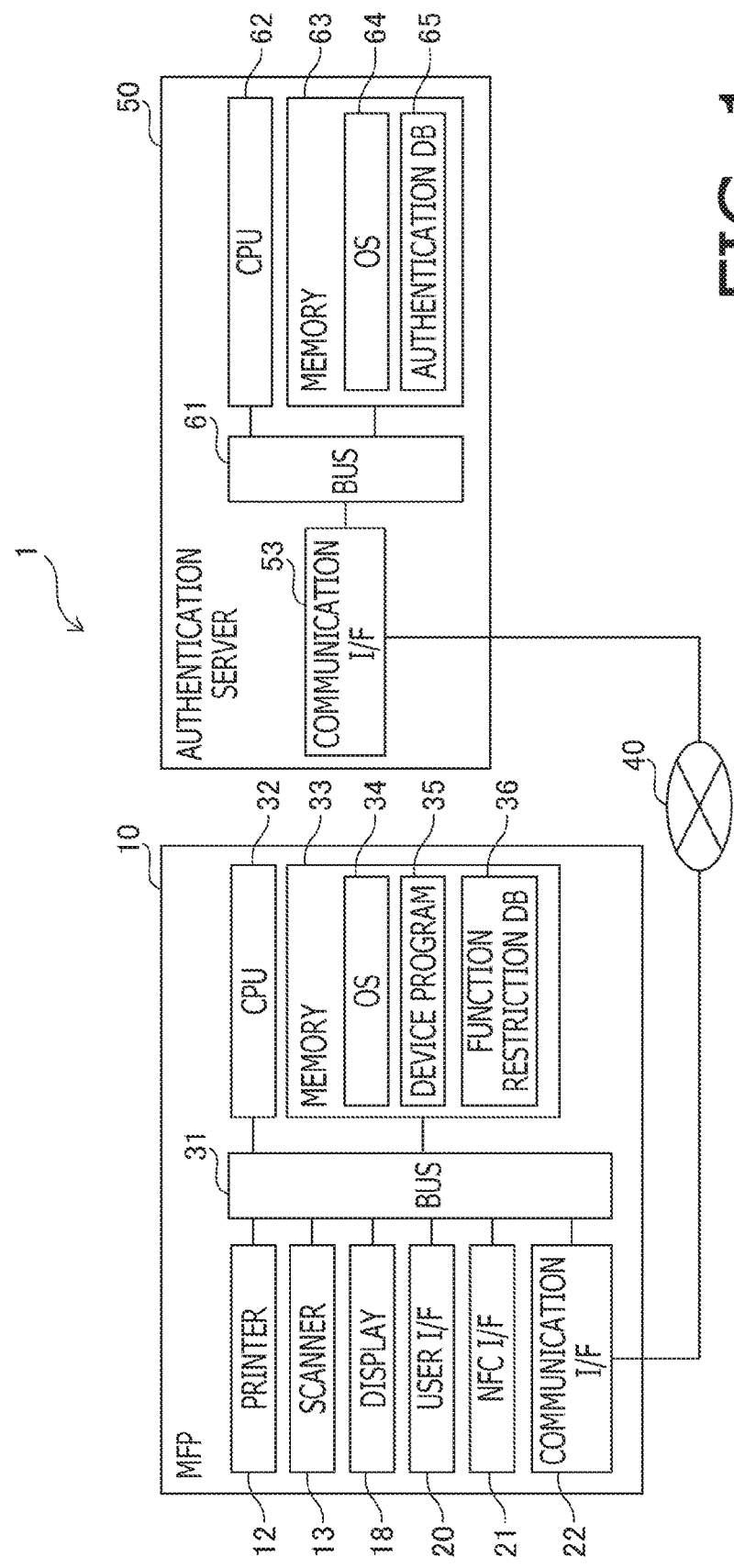
FIG. 1 is a block diagram of an image processing system according to a first embodiment of the present disclosures.

An image processing system 1 shown in FIG. 1 includes an MFP (multi-function peripheral) 10 and an authentication server 50. The MFP 10 and the authentication server 50 are connected through a communication network 40 so as to communicate with each other. It is noted that a type of the communication network 40 need not be limited to a particular one, but could be any suitable one such as a LAN (local area network).

Configuration of MFP

The MFP 10 is a multi-function peripheral configured to perform a plurality of functions including a printing function, a copying function, and a scanning function. In the following description, all the functions provided to the MFP 10 will occasionally be collectively referred to as a "function."

As shown in FIG. 1, the MFP 10 mainly has a printer 12, a scanner 13, a display 18, a user I/F 20, an NFC I/F 21, a communication I/F 22, a CPU 33 and a memory 33, which are interconnected through a communication bus 31.

The printer 12 is configured to print color images or black-and-white images based on print data in accordance with an inkjet printing method, an electrophotographic imaging method, or the like. The scanner 13 is configured to read an image on an original document placed on a document table (not shown) provided to the MFP 10, and create image data representing the read image.

The display 18 is, for example, an liquid crystal display. The display is configured to display various setting windows, operational sates of devices/components and the like. The user I/F 20 is provided with operation buttons such as a power button, and is configured to be operated to receive user's instructions. It is noted that the display 18 and the user I/F 20 may be configured as a single operation panel employing a touch panel configuration. The NFC I/F 21 is configured to perform an NFC (near field communication) which is a wireless communication with an external device, such as an IC card which is also configured to perform the NFC, located within a particular range from the NFC I/F 21.

The communication I/F 22 is configured to perform a communication through the communication network 40. The CPU 32 is configured to control an entire operation of the MFP 10.

The memory 33 is realized by a RAM, a ROM, an EEPROM, an HDD, a portable storage medium (e.g., a USB memory) detachable to and attachable from the MFP 10, a buffer provided to the CPU 32, or a combination of some or all of the same. The memory 33 stores a device program 35, a function restriction DB (database) 36 and the like. The function restriction DB 36 is a database in which availability of each function for each user is described as mentioned later. The CPU 32 is configured to retrieve programs from the memory 33 and execute the same. It is noted that the device program 35 may be a single program or aggregation of multiple programs. The memory 33 is configured to store data and/or information necessary for executing the device program 35. It is noted that the memory 33 stores an EWS (embedded web server) program for realizing a web server, and thus, the MFP 10 is configured to function as a web server.

The memory 33 may be a computer-readable storage medium. The computer-readable storage medium is a non-transitory medium. It is noted that the non-transitory medium includes, in addition to the above-described example, a recording medium such as a CD-ROM and a DVD-ROM. Further, the non-transitory medium is also a tangible medium. In contrast, an electrical signal carrying programs downloaded from a server or the like on the Internet is a kind of the computer-readable medium, but is not regarded as the non-transitory computer-readable storage medium.

Configuration of Authentication Server

Examples of the authentication server 50 include an AD (active directory) server and an LDAP (lightweight directory access protocol) server. The authentication server 50 is provided with a communication I/F 53, a CPU 62 and a memory 63.

The communication I/F 53 is configured to perform a communication through the communication network 40. The memory 63 is realized by a RAM, a ROM, an EEPROM, an HDD or a combination of some or all of the same. The memory 63 is configured to store an OS 64, and an authentication DB (database) 65. The CPU 62 is configured to retrieve programs from the memory 63 and execute the same. The authentication DB 65 is a database configured such that, as shown in FIG. 4, items such a user ID, a password and an email address are associated with each other to form one record.

Function of MFP

The printing function of the MFP 10 is, for example, to print an image on a sheet based on a print job, which is transmitted through the communication network 40 from a PC operated by a user, with use of the printer 12. The copying function is to print out image data created by the scanner 13 on a sheet with user of the printer 12. The scanning function is, for example, to transmit image data created by the scanner 13 to an external device such as a PC through the communication network 40.

The MFP 10 has a security function which is a function of restricting execution of respective functions by a user who has not be authenticated. The security function includes a first authentication mode and a second authentication mode. In the first authentication mode, the functions are restricted based on the authentication by referring to the authentication DB 65. In the second authentication mode, the functions are restricted based on the authentication by referring to the function restriction DB 36.

FIG. 2 shows an example of a security function setting screen 80 on which a setting of the security function can be made. On the security setting screen 80, radio buttons allowing the user to select one of an "OFF" state, a "FUNCTION RESTRICTION" and an "AUTHENTICATION SERVER" are displayed. When the "OFF" state is selected, the MFP 10 disables the security function. When the "FUNCTION RESTRICTION" is selected, the MFP 20 applies the second authentication mode to the security function (i.e., executes the security function referring to the function restriction DB 36). When the "AUTHENTICATION SERVER" is selected, the MFP 10 applies the first authentication mode to the security function (i.e., executes the security function referring to the authentication DB 65). That is, if the security function is disabled (i.e., if the MFP 10 is in the "OFF" state), the authentication for the login is not executed when a user uses the MFP 10. Further, if the security function is to be enabled (i.e., if the MFP 10 is not in the "OFF" state), the authentication according to one of the first authentication mode and the second authentication mode is selectively executed when a user uses the MFP 10.

It is noted that the authentication according to the second authentication mode is performed by collating information input through the user I/F 20 and the function restriction DB 36. When a result of the authentication in the second authentication mode is successful, the MFP 10 enables the function(s) available for the user. That is, when an input combination of the user ID and a PIN matches a value stored in the function restriction DB 36, or when the card ID matches a value stored in the function restriction DB 36, it is determined that the authentication is successful. As shown in FIG. 3, the function restriction DB 36 is configured that items of "USER ID," "PIN," "CARD ID," "EMAIL ADDRESS," "PRINT," "COPY," and "SCAN" constitute one record. In each of the "PRINT," "COPY," and "SCAN" items, a value indicating one of "available" or "unavailable" is inserted. In the example shown in FIG. 3, "available" is indicated by "o" while "unavailable" is indicated by "x." In the following description, information indicating whether "available" or "unavailable" is associated with each of the "PRINT," "COPY," and "SCAN" items will occasionally be referred to as availability information. The CPU 32 refers to the function restriction DB 36 and enables the function(s) indicated to be "available."

In a state where the user logged in to the MFP 10 with a user ID which has been successfully authenticated, the CPU 32 displays a standby screen 110 (see FIG. 7). On the standby screen 110, a plurality of buttons 111-113 is displayed. The function buttons 111-113 correspond to functions to be executed, respectively (e.g., a print button 111, a copy button 112 and a scan button 113). When one of the function buttons 111-113 is selected, the CPU 32 searches the function restriction DB 36 for a line (i.e., record) of the user ID which was authenticated, and obtains information (i.e., "available" or "unavailable") of the function corresponding to the selected function button. When the obtained information indicates "available," the CPU 32 executes an image processing operation corresponding to the selected function button. On the other hand, when the obtained information indicates "unavailable," the CPU 32 does not execute an image processing operation corresponding to the selected function button.

The MFP 10 is configured such that, when the first authentication mode is applied to the security function, a lock screen 100 (see FIG. 6) is displayed on the display 18 in response to the MFP 10 being powered ON. When login information including the user ID and the password is obtained through the user I/F 20 on the lock screen 100, the CPU 32 transmits the obtained login information to the authentication server 50 and requests execution of authentication. When a response transmitted from the authentication server 50 indicates success of the authentication, the CPU 32 switches the state of the MFP 10 from a logged-out state to a logged-in state. It is noted that the logged-out state is a state in which the MFP 10 (or the CPU 32) does not accept an execution instruction of a function through the user I/F 20, and the logged-in state is a state in which the MFP 10 (or the CPU 32) accepts an execution instruction of a function through the user I/F 20. When the state of the MFP 10 is switched to the logged-in state, a screen displayed on the display 18 is switched to the standby screen 100 (see FIG. 7). According to the illustrative embodiment, when the MFP 10 is logged in in the first authentication mode, all the functions (e.g., the printing function, the copying function and the scanning function) become executable. It is note that, in the first authentication mode, it is determined that the authentication is successfully done when the input login information coincides with corresponding information registered with the authentication DB 65.

It is noted that an administrator of the image processing system 1 inputs settings of the security setting screen 80 and the function restriction screen 36 with use of an EWS function. The administrator invokes a browser on a PC connected to the communication network 40, and inputs the IP address of the MFP 10. Then, the CPU 32 provides a setting screen configured to receive settings (i.e., values/contents) input by the administrator. The CPU 32 stores setting values/contents input by the administrator in the memory 33.

When the first authentication mode is applied to the security function of the MFP 10, the administrator performs settings through an authentication server setting screen 90 (see FIG. 5) in addition to settings through the security function setting screen 80 (see FIG. 2). In the authentication setting screen 90, a server address text box 91, a domain name text box 92, ON and OFF radio buttons 93, ON and OFF radio buttons 94, an administrator ID text box 95, and an administrator PW text box 96 are displayed. The ON and OFF radio buttons 93 are for setting whether or not the authentication sever 50 is to be referred to and information is obtained therefrom at the time of registration (i.e., when a registration process is executed). The ON and OFF radio buttons 94 are for setting whether or not the authentication server 50 is to be referred to at the time of authentication (i.e., when the authentication process is executed). The registration process and the authentication process will be described later.

The administrator inputs the URL and domain name of the server, in which the user ID of the user using the MFP 10 is managed, in the server address text box 91 and the domain name text box 92, respectively. In accordance with the input information, the authentication server 50 to which the authentication is requested in the second authentication mode is identified.

When the administrator sets the setting of at least one of the radio buttons 93 and the ratio buttons 94 to ON, the administrator is required to input the administrator ID and the administrator password in the administrator ID text box 95 and the administrator password text box 96, respectively.

The administrator ID and the administrator password are administrator information which have been registered in the authentication DB 65 in advance, and when the authentication using the administrator information is successfully done, it becomes possible to obtain the user information registered in the authentication DB 65. The CPU 32 stores the setting values input through the setting screen by the administrator in the memory 33. In the following description, the process of storing, in the memory 33, values input in the function restriction DB 36, the authentication DB 65 and on the authentication server setting screen 90 in response to input of the same and/or a state where the such values are stored in the memory 33 will occasionally be expressed to by a term "registered."

It is noted that when the input on the securing setting screen 80 is switched between the "FUNCTION RESTRICTION" and the "AUTHENTICATION SERVER," the CPU 32 performs an operation to switch the authentication mode of the security function between the "first authentication mode" and the "second authentication mode." Further, in response to switching the authentication mode from the "second authentication mode" to the "first authentication mode," the CPU 32 performs an operation to delete all the values in the function restriction DB 36.

In the above-described embodiment, in the first authentication mode, the CPU 32 transmits the login information obtained through the user I/F 20 to the authentication server 50 to request the authentication. Then, when the authentication is done successfully, the MFP 10 becomes in the logged-in state. Additionally, when the card ID, which has been registered with the function restriction DB 36 in the registration process described later, is input (i.e., obtained from a card), the MFP 10 also becomes in the logged-in state. According to the above, when the registered card ID is input, it becomes possible to switch the state of the MFP 10 to the logged-in state without performing a communication with the authentication server 50.

Registration Process

Firstly, the registration process will be described. For the sake of description, it is assumed that, in the MFP 10, the "AUTHENTICATION SERVER" is selected on the securing setting screen 80, and the first authentication mode is applied to the security function of the MFP 10.

When the MFP 10 is powered ON, the CPU 32 displays the lock screen 10 (see FIG. 6) on the display 18. In response to determination that the authentication is done successfully in the authentication process (described later), the state of the MFP 10 is switched to the logged-in state, and the standby screen 110 (see FIG. 7) is displayed on the display 18.

In the following description, the user who is successfully authenticated will be referred to as a logged-in user. When authenticated, the CPU 33 stores login information of the logged-in user in the memory 33. The login information includes the user ID and the password input (when the user logged in with use of the card, only the card ID) at a time when the user logged in. The login information also includes a login method (e.g., whether the login is performed with use of the card). On the standby screen 110, the print button 111, the copy button 112 and the scan button 113 are displayed.

The logged-in user selects a desired button when he/she wishes to cause the MFP 10 to execute one of the functions. When the user wishes to register card ID of a new authentication card with the function restriction DB 36, he/she locates the authentication card at a position close to the NFC I/F 21. It is noted that the authentication card is an IC card configured to communicate with the NFC I/F 21. It is further assumed that the new authentication card is formed such that the card ID has been stored in a build-in IC in advance. The CPU 32 is configured to obtain the card ID from the closely located authentication card by near field communication between the NFC I/F 21 and the authentication card. It is noted that the CPU 32 may receive the card ID transmitted by the closely located authentication card by near field communication.

When the card ID is obtained from the authentication card by communication through the NFC I/F 21 while the standby screen 110 is being displayed, the CPU 32 starts the registration process shown in FIG. 8. Firstly, the CPU 32 determines whether the user ID of the logged-in user stored in the memory 33 is registered with the function restriction DB 36 (S3). In response to determination that the user ID is not registered with the function restriction DB 36 (S3: NO), the CPU 32 newly registers the user ID of the logged-in user and the value of PIN with the function restriction DB 36 (S5), and proceeds to step S7. It is noted that the value of the PIN is a preliminarily determined fixed value. On the other hand, in response to determination that the user ID is registered with the function restriction DB 36 (S3: YES), the CPU 32 proceeds to step S7, skipping step S5.

In step S7, the CPU 32 determines whether the login is performed with use of a card. As the registration process is executed, the card ID associated with the user ID is registered with the function restriction DB 36. If the registration process was executed in the past, there could be a case where the state of the MFP 10 is switched to the logged-in state by success of the authentication using the authentication card, and the registration process is started. Therefore, the CPU 32 determines whether the login is performed with use of the card in step S7. Switching to the logged-in state is done in response to input of the login information, the CPU 32 determines that the login is not done with use of the card. Switching to the logged-in state in response to obtaining the card ID, the CPU 32 determines that login is done with use of the card.

In step S7, in response to determination that login performed without using the card (S7: NO), the CPU 32 transmits, to the authentication server 50, the login information input at the time when the user logs in to the MFP 10, requests the email address which is information other than the login information, and receives the transmitted information (S13). The authentication server 50 transmits the registered email address, when an email address corresponding to the transmitted user ID is registered with the authentication DB 65. On the other hand, when the email address corresponding to the transmitted user ID is not registered with the authentication DB 65, the authentication server 50 transmits a message indicating that there is no information.

On the other hand, in step S7, in response to determination that the login is performed with use of a card (S7: YES), the CPU 32 determines whether to inquire information to the authentication server (S9). When the information indicating that the radio button 93 for the ON state (see FIG. 5) is selected is stored in the memory 33, the CPU 32 determines to inquire information to the authentication server 50. When the information indicating that the radio button 93 for the OFF state is selected is stored in the memory 33, the CPU 32 determines not to inquire information to the authentication sever 50. In response to determination to inquire information to the authentication server 50 (S9: YES), the CPU 32 uses values input in the administrator ID text box 95 and the administrator PW text box 96 as the user ID and the password to be authenticated, respectively, and requests the authentication sever 50 to transmit the email address of the user ID of the logged-in user. Then, the CPU 32 receives and obtains the transmitted information (S11), and proceeds to S15. When it is determined not to inquire information to the authentication server 50 (S9: NO), the CPU 32 skips S11 and proceeds to S15.

Next, the CPU 32 determines whether the card ID obtained through the NFC I/F 21 when the registration process is started has been registered with the function restriction DB 36 (S15). In response to determination that the card ID has not registered with the function restriction DB 36 (S15: NO), the CPU 32 associates the user ID of the logged-in user with the card ID obtained when the registration process is started, updates the function restriction DB 36 (S17) (i.e., registers the card ID and the user ID in association with each other), and proceeds to step S21. It is noted that the CPU 32 updates all pieces of availability information corresponding to the card ID of the function restriction DB 36 to "available" in step S17. On the other hand, in step S15, in response to determination that the card ID has registered with the function restriction DB 36 (S15: YES), the CPU 32 displays an error message (e.g., "the card has already been registered.") on the display 18 (S19), and proceeds to step S21.

In step S21, the CPU 32 determines whether the email address has been obtained. When the email address transmitted from the authentication server 50 has been received in steps S11 or S13, the CPU 32 determines that the email address has been obtained. When a message indicating that there is no message is received from the authentication server 50 or when step S11 is not executed as determination in step S9 is "NO," the CPU 32 determines that the email address has not been obtained. In response to determination that the email address has been obtained (S21: YES), the CPU 32 registers the email address with the function restriction DB 36 in association with the user ID of the logged-in user and terminates the registration process. On the other hand, in response to determination that the email address has not been obtained (S21: NO), the CPU 32 skips step S23 and terminates the registration process.

When, for example, a user A logs in using an authentication card, and wishes to perform the registration process using another authentication card which is different from the card used for login, unless card ID of the different authentication card has been registered with the function restriction DB 36, the value of the card ID associated with the user A in the function restriction DB 36 is updated from the card ID of the authentication card used for login to the card ID of the other authentication card. When the other authentication card has already been registered with the function restriction DB 36, registration of the card ID of the other authentication card results in an error. In that case, the value of the card ID associated with the user A in the function restriction DB 36 remains such that the card ID of the authentication card used for login. Even in such a case, however, when the email address is successfully obtained, the obtained email address is associated with user ID of the user A in the function restriction DB 36.

When, for example, a user B logs in with user ID and a password, while card ID of an authentication card is not registered with the function restriction DB 36, at least the user ID and the card ID are associated with each other and registered with the function restriction DB 36. When the card ID of the authentication card has already been registered with the function restriction DB 36, registration of the card ID results in an error, and the card ID is not registered with being associated with the user B with the function restriction DB 36. Even in such a case, when the email address is successfully obtained, the obtained email address is associated with the user ID of the user B in the function restriction DB 36.

When the user ID is not registered with the function restriction DB 36 before execution of the registration process, determination in step S3 is "NO," the user ID is newly registered with the function restriction DB 36 in step S5 and the card ID is registered in step S17. That is, the user ID and the card ID are newly registered with the function restriction DB 36. On the other hand, when the user ID has already been registered with the function restriction DB 36 before execution of the registration process, determination in step S3 is "YES" and the card ID of the registered user ID is updated (i.e., overwritten) in step S17. According to the above configuration, an overlapping registration in which multiple card ID's are associated with the same user ID can be prevented.

Authentication Process

Next, referring to FIG. 9, the authentication process will be described. As described above, when the MFP 10 is powered ON, the CPU 32 displays the lock screen 100 (see FIG. 6) on the display 18. On the lock screen 100, a user ID text box 101, a password text box 102 and an OK button 103 are displayed. When the OK button 103 is selected by the user, or when the authentication card is moved close to the NFC I/F 21 during the lock screen 100 being displayed and the card ID of the authentication card is obtained through the NFC I/F 21, the CPU 32 starts the authentication process.

When the authentication process is started, the CPU 32 determines whether the login is done with use of a card (S31). When the authentication process has started in response to user's selection of the OK button 103, the CPU 32 determines that the login is not performed with use of a card (S31: NO). When the authentication process has started as the card ID was obtained through the NFC I/F 21, the CPU 32 determines that the login is performed with use of a card (S31: YES). In response to determination that the login is not performed with use of a card (S31: NO), the CPU 32 transmits login information including the input user ID and the input password to the authentication server 50 and requests for authentication (S47).

In response to the request for the authentication, the authentication server 50 performs the authentication by collating the received login information and information in the authentication DB 65, and transmits a result of the authentication (i.e., success or failure of authentication) to the MFP 10.

In response to receipt of a result of the authentication, the CPU 32 determines whether the authentication is done successfully or failed based on the result (S43). When receiving the result indicating that the authentication is done successfully, and determining that the authentication is done successfully (S43: YES), the CPU 32 switches the state of the MFP 10 to the logged-in state. Further, the CPU 32 stores, in the memory 33, the user ID and the password input as the login information, and information indicating a login method of the current login (i.e., the current login is performed using the authentication server 50). Then, the CPU 32 displays the standby screen 110 (see FIG. 7) on the display 18 (S39), and terminates the authentication process. On the other hand, in response to determination of failure of authentication (S43: NO), the CPU 32 displays an error message (e.g., "Login Failed") on the display 18 (S45) and terminates the authentication process.

On the other hand, in response to determination that the login is performed with use of a card (S31: YES), the CPU 32 determines whether the obtained card ID has been registered with the function restriction DB 36 (S33). When it is determined that the received card ID has not registered with the function restriction DB 36 (S33: NO), the CPU 32 displays, in step S35, an error message on the display as in step S45, and terminates the authentication process. When it is determined that the obtained card ID has registered with the function restriction DB 36 (S33: YES), the CPU 32 determines whether authentication by the authentication server 50 is to be performed (S37).

When the information indicating that "ON" of the authentication time server reference radio button 94 (see FIG. 5) is selected is stored in the memory 33, the CPU 32 determines that the authentication by the authentication server 50 is to be performed in step S37. When the information indicating that the radio button 94 is in the "OFF" state (see FIG. 5) is stored in the memory 33, the CPU 32 determines that the authentication by the authentication server 50 need not be performed in step S37.

When it is determined that the authentication by the authentication server 50 need not be performed (S37: NO), the CPU 32 proceeds to step S39. In that case, the CPU 32 stores, in the memory 33, the card ID obtained through the NFC I/F 21 and information indicating a login method of the current login (i.e., the current login is performed using the card). Then, the CPU 32 displays the standby screen 110 (see FIG. 7) on the display 18 (S39), and terminates the authentication process.

On the other hand, when it is determined that the authentication by the authentication server 50 is to be performed (S37: YES), the CPU 32 proceeds to step S41. In step S41, the CPU 32 transmits, to the authentication server 50, the values input in the administrator ID text box 95 and the administrator password text box 96 as the user ID and the password to be authenticated, respectively, and requests for authentication. Further, in step S41, the CPU 32 makes an inquire to the authentication server 50 whether the user ID associated with the card ID in the function restriction DB 36 is registered with the authentication DB 65.

In response to receipt of the request for the authentication and the inquiry from the MFP 10, the authentication server 50 performs the authentication and transmits a result of the authentication to the MFP 10. When the administrator ID and the administrator password have been registered with the authentication DB 65, and the user ID has been also registered with the authentication DB 65, the authentication server 50 transmits a result of determination indicating that the authentication is successfully done to the MFP 10. When the administrator ID or the administrator password have not been registered with the authentication DB 65, or the user ID has not been registered with the authentication DB 65, the authentication server 50 transmits a result of determination indicating that the authentication is failed to the MFP 10.

The CPU 32 proceeds to step S43 after execution of step S41. In step S43, in response to receipt of the result of the authentication, the CPU 32 determines whether the authentication is done successfully or failed based on the result. When it is determined that the authentication is successfully done as a result of inquiry to the authentication server 50 in step S41, the CPU 32 stores the card ID and information indicating that the login method (i.e., the current login is performed using the card) in the memory 33.

Transmission Destination Setting Process

Next, referring to FIG. 10, a transmission destination setting process will be described.

The MFP 10 has a mail transmission function which is a function of transmitting e-mail to a designated destination. Further, as one of scanning functions, the MFP 10 has a function of transmitting image data as an attached file of an e-mail message.

When the scan button 113 (see FIG. 7) is selected, the CPU 32 displays a menu screen (not shown) encouraging the user to select a transmission destination of image data on the display 18. When the function of transmitting image data as an attached file of an e-mail message is selected, the CPU 32 starts the transmission destination setting process.

When the transmission destination setting process is started, the CPU 32 determines whether the login is performed with use of a card (S51) as in step S7 (see FIG. 8). When it is determined that the login is performed with use of the card (S51: YES), the CPU 32 refers to the function restriction DB 36 and obtains an email address corresponding to the user ID of the logged-in user (S53), and proceeds to step S55. When it is determined that the login is performed without using the card (S51: NO), since the login must be performed with use of a user ID and a password, as in step S13, the CPU 32 transmits, to the authentication server 50, the user ID and the password which were input when the user logged in to the MFP 10, requests the authentication server 50 to transmit the email address, receives and obtains information (i.e., the email address) transmitted from the authentication server 50, and proceeds to step S55.

In step S55, as in step S21, the CPU 32 determines whether the email address has been obtained. When it is determined that the email address has been obtained (S55: YES), the CPU 32 sets the obtained email address to the transmission destination (S57) and terminates the transmission destination setting process. On the other hand, when it is determined that the email address has not been obtained (S55: NO), the CPU 32 displays an error message (e.g., "Transmission destination cannot be obtained.") on the display 18 (S61) and terminates the transmission destination setting process.

After executing step S57 and then terminating the transmission destination setting process, for example, in response to selection of an execution button (not shown) of the user I/F 20, the CPU 32 executes a process of causing the scanner 13 to create image data and causing the communication I/F 22 to transmit the created image data as an attached file of an email message to the email address designated in the transmission destination setting process.

It is noted that the MFP 10 is an example of an image processing apparatus, the memory 33 is an example of a memory, the communication I/F 22 is an example of a first communication interface, the NFC I/F 21 is an example of a second communication interface, the user I/F 20 is an example of a user interface, the CPU 32 is an example of a controller, and the authentication sever 50 is an example of an authentication server.

Further, the user ID is an example of user identification information. The user ID and the password input on the lock screen 100 are examples of first user identification information and a first password included in first authentication information, respectively. The card ID is an example of terminal identifying information which identifies an external terminal. The administrator ID and the administrator password are examples of second user identification information and a second password included in second authentication information, respectively. Further, the authentication DB 65 is an example of a first database, and the function restriction DB 36 is an example of a second database.

Further, step S47 executed when the CPU 32 determines that the login is performed without using of a card (S31: NO) is an example of a first authentication process. A process of determining "YES" in step S33 which is executed as the CPU 32 determines that the login is performed with use of the card (S31: YES) is an example of second authentication process. A process of step S39 which is executed as the CPU 32 determines that the authentication is done successfully (S43: YES) is an example of a first login process. A process of step S39 which is executed as the CPU 32 determines that the card ID is included in the function restriction DB 36 (S33: YES) is an example of a second login process. A process of step S17 of the registration process is an example of a first registration process. A process of step S15 of the registration process is an example of a determination process. A process of step S41 which is executed as the CPU 32 determines that authentication by the authentication server 50 is to be performed (S37: YES) is an example of a third authentication process. A process of step S13 is an example of an obtaining process, and a process of step S23 is an example of a second registration process. A process of step S57 is an example of a setting process.

Hereinafter, effects of the first embodiment will be described.

In the authentication process, the CPU 32 requests the authentication server to perform authentication based on the input user ID and the input password. When the authentication is done successfully, the CPU 32 switches a state of the MFP 10 to the logged-in state in step S39. In response to obtaining the card ID in the logged-in state, the CPU 32 starts the registration process. In step S17 of the registration process, the CPU 32 stores the user ID of the logged-in user with associating the card ID in the memory 33. According to the above process, the user ID of the logged-in user, who has been authenticated, is registered with the function restriction DB 36 in association with the card ID.

Further, in response to obtaining the card ID in the logout state, the CPU 32 performs the authentication by collating the card ID and the function restriction DB 36 stored in the memory 33 in step S33 of the authentication process. When the authentication is done successfully, the CPU 32 changes the state of the MFP 10 to the logged-in state in step S39. As above, the MFP 10 is capable of performing the authentication based on the function restriction DB 36 stored in the memory 33 which is substantially the same as the authentication based on the authentication DB 65 stored in the authentication server 50, without communicating with the authentication server 50.

The CPU 32 associates the card ID with the user ID in step S17 of the registration process, and registers with the function restriction DB 36 with setting the availability information to "available." Accordingly, the CPU 32 can register corresponding information between the user ID and the card ID with the function restriction DB 36.

When the "authentication server" is selected on the security setting screen 80 or when the "function restriction" is selected, the CPU 32 selectively applies the first authentication mode or the second authentication mode to the security function. When the selection on the security setting screen 80 is switched between the "function restriction" and the "authentication server," the CPU 32 executes a process to switch the mode between the first authentication mode and the second authentication mode. Accordingly, the user can select appropriate authentication mode depending on an environment.

In response to switching the security function from the second authentication mode to the first authentication mode, the CPU 32 performs a process of deleting information registered with the function restriction DB 36. Accordingly, a free capacity of the memory 33 can be secured.

When, in step S15 of the registration process, it is determined that the card ID is not registered with the function restriction DB 36 (S15: NO), the CPU 32 associates the card ID with the user ID and stores the same in the memory 33. On the other hand, when it is determined that the card ID is registered with the function restriction DB 36 (S15: YES), the CPU 32 does not store the user ID in association with the card ID. Accordingly, the overlapping registration to register multiple user ID's for the same card ID can be prevented.

When it is determined that the card ID is registered with the function restriction DB (S33: YES) and it is determined that the authentication by the authentication sever 50 is to be performed (S37: YES), the CPU 32 requests for the authentication by using the administrator ID and the administrator password and the authentication by collating the user ID of the logged-in user in step S41. Then, in response to the authentication being done successfully (S43: YES), the CPU 32 executes step S39. Accordingly, relatively high security can be established.

The CPU 32 obtains an email address from the authentication server 50 in step S13 and registers the obtained email address with the function restriction DB 36 in step S23. With this process, the email addresses registered with the authentication DB 65 can be registers with the function restriction DB 36. In the transmission destination setting process, when it is determined that the login is performed with use of a card (S51: YES), the CPU 32 obtains an email address from the function restriction DB 36 (S53) and set the obtained email address to the transmission destination of an email (S57). On the other hand, when it is determined that the login is performed without using a card (S51: NO), the CPU 32 obtains an email address from the authentication mail server 50 (S59) and sets the obtained email address to the transmission destination of email (S57). Accordingly, the user can set the transmission destination without actually inputting the letter string of the email address. Therefore, there is provided the MFP 10 having good convenience.

Second Embodiment

Next, a registration process according to a second embodiment of the present disclosures will be described. A hardware configuration of the image processing system according to the second embodiment is the same as that of the first embodiment. In the second embodiment, the CPU 32 is also configured to execute the authentication process.

Similar to the first embodiment, according to the second embodiment, when the card ID of the authentication card is obtained through the NFC I/F 21, the CPU 32 starts a registration process shown in FIGS. 11A and 11B. In the following description of the registration process shown in FIGS. 11 and 11B, steps same as those of the first embodiment will be indicated with the same step number, and detailed description thereof will be omitted.

When the registration process is started, the CPU 32 execute step S15. When determination in step S15 is "YES," the CPU 32 executes step S19, and terminates the registration process. When determination in step S15 is "NO," the CPU 32 executes step S7. When determination in step S7 is "NO," the CPU 32 executes step S13, then executes step S21.

When determination in step S7 is "YES," the CPU 32 executes step S9. When determination in step S9 is "YES," the CPU 32 executes step S11, and then step S21. When determination in step S9 is "NO," since the login is performed with use of the authentication card and the user ID of the logged-in user has already been registered with the function restriction DB 36, the CPU 32 associates the card ID obtained when the registration process is started with the user ID of the logged-in user, and updates the function restriction DB 36 therewith (S81). Thereafter, the CPU 32 terminates the registration process.

When determination in step S21 is "YES," the CPU 32 determines whether the user ID of the logged-in user has been registered with the function restriction DB 36 (S71). When the user ID of the logged-in user has not been registered with the function restriction DB 36 (S71: NO), the CPU 32 associates the card ID and the email address with the user ID of the logged-in user, newly registers the same with the function restriction DB 36 (S73), then terminates the registration process. When it is determined that the user ID of the logged-in user has been registered with the function restriction DB 36 (S71: YES), the CPU 32 associates the card ID obtained when the registration process is started and the email address transmitted with the user ID of the logged-in user, updates the function restriction DB 36 therewith (S75), and terminates the registration process.

On the other hand, when determination in step S21 is "NO," the CPU 32 determines whether the user ID of the logged-in user has been registered with the function restriction DB 36 (S77). When it is determined that the user ID of the logged-in user is not registered with the function restriction DB 36 (S77: NO), the CPU 32 associates the card ID with the user ID of the logged-in user, registers the same with the function restriction DB 36 (S79), and terminates the registration process. When it is determined that the user ID of the logged-in user has been registered with the function restriction DB 36 (S77: YES), the CPU 32 executes step S81, and terminates the registration process. As above, according to the registration process of the second embodiment, when the card ID has been registered with the function restriction DB 36, the information registered with the function restriction DB 36 is not updated regardless of whether or not the user ID has been registered with the function restriction DB 36.

It is noted that steps S73 and S75 are examples of a first registration process and a second registration process, respectively. Further, steps S79 and S81 are examples of the first registration process, and step S13 is an example of an obtaining process.

According to the above-described second embodiment, the following effects can be provided.

In the registration process, when determination in step S71 is "YES," the CPU 32 updates the card ID associated with the user ID which has already been registered with the function restriction DB 36 to the card ID which is obtained through the NFC I/F 21 in step S75. When determination in step S71 is "NO," the CPU 32 associates the card ID obtained through the NFC I/F 21 with the user ID and registers the same with the function restriction DB 36 as new corresponding information in step S73. Accordingly, the overlapping registration to register multiple user ID's for the same card ID can be prevented.

It is noted that aspects of the present disclosures should not be limited to above-described embodiments, but can be modified in various ways without departing from aspects the disclosures.

According to the above-described embodiments, the MFP 10 is configured to apply the first authentication mode or the second authentication mode to the security function. However, aspects of the present disclosures need not be limited to such a configuration. For example, the above configuration may be modified such that even in a case where the second authentication mode is not applied to the security function and the function restriction DB 36 is not stored in the memory 33, the corresponding information between the user ID and the card ID may be stored in the memory 33. In that case, the CPU 32 may perform authentication by collating a card ID obtained from a card and the corresponding information stored in the memory 33.

According to the above-described embodiments, when the mode of the security function is switched from the second authentication mode to the first authentication mode, the information stored in the function restriction DB 36 is deleted. However, aspects of the present disclosures need not be limited to such a configuration. For example, only part of information (e.g., information of the card ID) stored in the function restriction DB 36 may be deleted, while the other information (e.g., the availability information) may be remained. According to such a modification, the card ID corresponding to the logged-in user who is successfully authenticated is newly registered, while the availability information is remained. Therefore, the information stored in the function restriction DB 36 can be taken over, and user's operation of re-inputting the same can be saved.

According to the above-described configuration, all the pieces of the availability information for all the functions are set to "available" in step S17. However, aspects of the present disclosures need not be limited to such a configuration. For example, only a part of functions may be set to "available." It is noted that the above-described process executed in step S17 may be executed in step S5 instead of step S17. Further, according to the above-described embodiments, a fixed value is input in PIN in step S5. However, aspects of the present disclosure need not be limited to such a configuration.

According to the above-described embodiments, in the transmission destination setting process, a process of setting the email address registered with the function restriction DB 36 as a destination address of e-mail is described. However, aspects of the present disclosures need not be limited to such a configuration. For example, the process may be modified such that the email address registered with the authentication DB 65 may be set as a transmission source address of e-mail. Further, in the foregoing description, an email address is described as an example of information other than the login information. However, aspects of the present disclosures need not be limited to the email address.

Still further, according to the above-described embodiments, the transmission destination setting process is started at a time when the user operates to execute a function of transmitting the image data as attached file of the e-mail. However, aspects of the present disclosures need not be limited to such a configuration. For example, when a mail transmission function in which the email address associated with the user ID is set as the transmission destination is effective, the email address corresponding to the logged-in user may be obtained from the authentication sever 50 or the function restriction DB 36 when the user logs in, and registered the obtained email address as the transmission destination email address to be set when the mail transmission function is executed. Further, in a process of registering the mail address with the function restriction DB 36 in the registration process, an execution setting of the mail transmission function may be set to "available" when the user logged in.

In the foregoing description, the administrator ID and the administrator password are indicated as example of the second authentication information. However, the configuration does not intend that the user has an administrative right.

In the foregoing description, the IC card is indicated as an example of an external terminal. However, aspects of the present disclosures need not be limited to such a configuration. Another external terminal such as a smartphone having the NFC communication function could be another example of the external terminal.

Further, in the foregoing description, the NFC I/F is indicated as an example of the second communication interface. However, aspects of the present disclosures need not be limited to such a configuration. That is, it is sufficient that the second communication interface may be an interface capable of reading the external terminal (e.g., an IC card) which has a unique ID existing within a particular distance range such as a communication I/F according to Bluetooth® or one according to a particular communication method such as an infrared communication.

According to the foregoing description, the MFP 10 is indicated as an example of the image processing apparatus. However, aspects of the present disclosures need not be limited to such a configuration. That is, the image processing apparatus may be an apparatus having only one of the multiple functions such as the printing function. Further, according to the foregoing description, the functions of the MFP are indicated as functions of the image processing apparatus. However, the functions need not be limited to those of the MFP. For example, the image processing apparatus may include one or more other functions such as a facsimile communication function.

What is claimed is:

1. An image processing apparatus comprising:
   a memory;
   a first communication interface configured to communicate with an authentication server storing a first database, first user identification information being registered with the first database in association with a first password;
   a second communication interface configured to receive terminal identifying information from an external device located within a particular range from the image processing apparatus, the terminal identifying information identifying the external device;
   a user interface; and
   a controller;
   wherein the controller is configured to perform:
   in response to receipt, through the user interface, of first authentication information including the first user identification information and the first password while being in a logged-out state, a first authentication process of transmitting the first authentication information to the authentication server through the first communication interface and receiving an authentication result based on collation between the first authentication information and the first database, the logged-out state being a state in which the controller does not accept an execution instruction of an image processing operation;
   in response to receipt of an authentication result indicating that an authentication is successfully done in the first authentication process, a first login process of switching a state of the image processing apparatus from the logged out state to a logged-in state, the logged-in state being a state in which the controller accepts the execution instruction of the image processing operation;

in response to receipt of the terminal identifying information through the second communication interface while being in the logged-in state, a first registration process of storing the terminal identifying information in the memory as corresponding information, the terminal identifying information being associated, in the corresponding information, with the first user identification information included in the first authentication information;

in response to receiving the terminal identifying information through the second communication interface while being in the logged-out state, a second authentication process of performing authentication by collating the terminal identifying information and the corresponding information stored in the memory, the second authentication process determining that the authentication is successfully done when the terminal identifying information is included in the received terminal identifying information; and in response to determining that the authentication is successfully done in the second authentication process, a second login process of switching the state of the image processing apparatus from the logged-out state to the logged-in state.

2. The image processing apparatus according to claim 1, wherein the memory stores a second database in which the first user identification information, the terminal identifying information and availability information of each of at least one image processing operation are associated with each other, wherein the controller is configured to:

when the execution instruction of the image processing operation is input through the user interface, receive, from the second database, the availability information of the image processing operation corresponding to the first user identification information of a user who inputs the execution instruction and of which the execution instruction is input;

execute the image processing operation when the availability information indicating that the image processing operation is available, and not execute the image processing operation when the availability information indicating that the image processing operation is unavailable; and in the first registration process, store the corresponding information in the second database as the first user identification information and the terminal identifying information and store the availability information, which indicates that the image processing operation is available, corresponding to the first user identification information.

3. The image processing apparatus according to claim 2, wherein the controller is configured to:

perform authentication in one of a first authentication mode using the first database and a second authentication mode using the second database; and switch an authentication mode of the authentication between the first authentication mode and the second authentication mode in accordance with an operation input through the user interface.

4. The image processing apparatus according to claim 3, wherein the controller is configured to delete information stored in the second database in response to switching the authentication mode from the second authentication mode to the first authentication mode.

5. The image processing apparatus according to claim 1, wherein the controller is configured to:

perform a determination process of determining whether the terminal identifying information is stored in the memory as the corresponding information in response to the terminal identifying information is received through the second communication interface while being in the logged-in state; and in the first registration process, not store the terminal identifying information as the corresponding information in response to determination, in the determination process, that the terminal identifying information is stored in the memory, and store the terminal identifying information as the corresponding information in response to determination, in the determination process, that the terminal identifying information is not stored in the memory.

6. The image processing apparatus according to claim 1, wherein the controller is configured to:

when the first user identification information of the first authentication information is stored in the memory as the corresponding information, update the terminal identifying information associated with the first user identification information with the terminal identifying information received through the second communication interface in the first registration process; and when the first user identification information of the first authentication information is not stored in the memory as the corresponding information, store, in the memory as the corresponding information, the terminal identifying information received through the second communication interface and the first user identification information input for switching the state of the image processing apparatus to the logged-in state.

7. The image processing apparatus according to claim 1, wherein the controller is configure to:

store, in the memory, second authentication information including second user identification information and a second password;

in response to determining that the authentication is successfully done in the second authentication process while the second authentication information being stored in the memory, execute a third authentication process of:

transmitting, to the authentication server through the first communication interface, the second authentication information and the first user identification information corresponding to the terminal identifying information with which the second authentication process is successfully done; and receiving, from the authentication server, a determination result of collation between the second authentication information and the first database and determination whether the user authentication information is included in the database; and in response to receipt of the determination result indicating that the second authentication information is included in the first database and the user authentication information is included in the database, execute the second login process.

8. The image processing apparatus according to claim 1, further comprising a mail transmission function of transmitting e-mail to a designated destination, wherein a mail address associated with the first user identification information is stored in the first database,
wherein the controller is configured to perform:
an receiving process of receiving, from the authentication server, the mail address associated with the first authentication information after receipt of the authentication result indicating that the authentication of the first authentication process is successfully done;
a second registration process of storing, in the memory, the mail address received in the receiving process in association with the first user identification information; and
a setting process of:
in response to accepting an execution instruction of the mail transmission function while being in the logged-in state according to the first authentication process, setting the mail address received from the authentication server as a transmission source or a destination address of the e-mail; and
in response to accepting an execution instruction of the mail transmission function while being in the logged-in state according to the second authentication process, setting the mail address stored in the memory in the second registration process as a transmission source or a destination address of the e-mail.

9. A method of controlling an image processing apparatus having a memory, a first communication interface configured to communicate with an authentication server storing a first database, first user identification information being registered with the first database in association with a first password, a second communication interface configured to receive terminal identifying information from an external device located within a particular range from the image processing apparatus, the terminal identifying information identifying the external device, and a user interface, the method comprising:
receiving, through the user interface, first authentication information including the first user identification information and the first password while the image processing apparatus being in a logged-out state, the logged-out state being a state in which an execution instruction of an image processing operation is not acceptable;
in response to receiving of the first authentication information while the image processing apparatus being in the logged-out state, performing a first authentication of transmitting the first authentication information to the authentication server through the first communication interface and receiving an authentication result based on collation between the first authentication information and the first database;
in response to receiving an authentication result indicating that the first authentication is successfully done, switching a state of the image processing apparatus from the logged out state to a logged-in state, the logged-in state being a state in which the execution instruction of the image processing operation is acceptable;
receiving the terminal identifying information through the second communication interface while the image processing apparatus being in the logged-in state;
in response to receiving the terminal identifying information through the second communication interface while the image processing apparatus being in the logged-in state, storing the terminal identifying information in the memory as corresponding information, the terminal identifying information being associated, in the corresponding information, with the first user identification information included in the first authentication information;
receiving the terminal identifying information through the second communication interface while the image processing apparatus being in the logged-out state;
in response to receiving the terminal identifying information through the second communication interface while the image processing apparatus being in the logged-out state, performing second authentication by collating the terminal identifying information and the corresponding information stored in the memory, the second authentication being determined to be successfully done when the terminal identifying information is included in the received terminal identifying information; and
in response to determining that the second authentication is successfully done, switching the state of the image processing apparatus from the logged-out state to the logged-in state.

10. The method according to claim 9,
wherein the memory stores a second database in which the first user identification information, the terminal identifying information and availability information of each of at least one image processing operation are associated with each other,
wherein the method comprises:
when the execution instruction of the image processing operation is input through the user interface, receiving, from the second database, the availability information of the image processing operation corresponding to the first user identification information of a user who inputs the execution instruction and of which the execution instruction is input;
executing the image processing operation when the availability information indicating that the image processing operation is available, and not executing the image processing operation when the availability information indicating that the image processing operation is unavailable; and
storing the corresponding information in the second database as the first user identification information and the terminal identifying information and storing the availability information, which indicates that the image processing operation is available, corresponding to the first user identification information.

11. The method according to claim 10, comprising:
performing authentication in one of a first authentication mode using the first database and a second authentication mode using the second database; and
switching an authentication mode of the authentication between the first authentication mode and the second authentication mode in accordance with an operation input through the user interface.

12. The method according to claim 11, comprising deleting information stored in the second database in response to switching the authentication mode from the second authentication mode to the first authentication mode.

13. The method according to claim 9, comprising:
determining whether the terminal identifying information is stored in the memory as the corresponding information in response to the terminal identifying information is received through the second communication interface while being in the logged-in state; and
not storing the terminal identifying information as the corresponding information in response to determining that the terminal identifying information is stored in the memory, and storing the terminal identifying information as the corresponding information in response to determining that the terminal identifying information is not stored in the memory.

14. The method according to claim 9, comprising:
when the first user identification information of the first authentication information is stored in the memory as the corresponding information, updating the terminal identifying information associated with the first user identification information with the terminal identifying information received through the second communication interface; and
when the first user identification information of the first authentication information is not stored in the memory as the corresponding information, storing, in the memory as the corresponding information, the terminal identifying information received through the second communication interface and the first user identification information input for switching the state of the image processing apparatus to the logged-in state.

15. The method according to claim 9, comprising:
storing, in the memory, second authentication information including second user identification information and a second password;
in response to determining that the second authentication is successfully done while the second authentication information being stored in the memory:
  transmitting, to the authentication server through the first communication interface, the second authentication information and the first user identification information corresponding to the terminal identifying information with which the second authentication is successfully done; and
  receiving, from the authentication server, a determination result of collation between the second authentication information and the first database and determination whether the user authentication information is included in the database; and
in response to receiving the determination result indicating that the second authentication information is included in the first database and the user authentication information is included in the database, switching the state of the image processing apparatus from the logged-out state to the logged-in state.

16. The method according to claim 9,
wherein the image processing apparatus comprises a mail transmission function of transmitting e-mail to a designated destination,
wherein a mail address associated with the first user identification information is stored in the first database,
wherein the method comprises:
receiving, from the authentication server, the mail address associated with the first authentication information after receipt of the authentication result indicating that the first authentication is successfully done;
storing, in the memory, the received mail address in association with the first user identification information; and
accepting an execution instruction of the mail transmission function
in response to accepting the execution instruction of the mail transmission function while the image processing apparatus being in the logged-in state according to the first authentication, setting the mail address received from the authentication server as a transmission source or a destination address of the e-mail; and
in response to accepting the execution instruction of the mail transmission function while the image processing apparatus being in the logged-in state according to the second authentication, setting the mail address stored in the memory as a transmission source or a destination address of the e-mail.

17. A non-transitory computer-readable medium storing computer-readable instructions executable by a controller of an image processing apparatus having a memory, a first communication interface configured to communicate with an authentication server storing a first database, first user identification information being registered with the first database in association with a first password, a second communication interface configured to receive terminal identifying information from an external device located within a particular range from the image processing apparatus, the terminal identifying information identifying the external device, and a user interface, the instructions causing, when executed, the controller to perform:
in response to receipt, through the user interface, of first authentication information including the first user identification information and the first password while being in a logged-out state, a first authentication process of transmitting the first authentication information to the authentication server through the first communication interface and receiving an authentication result based on collation between the first authentication information and the first database, the logged-out state being a state in which the controller does not accept an execution instruction of an image processing operation;
in response to receipt of an authentication result indicating that an authentication in the first authentication process, a first login process of switching a state of the image processing apparatus from the logged out state to a logged-in state in which the controller accepts the execution instruction of the image processing operation;
in response to receipt of the terminal identifying information through the second communication interface while being in the logged-in state, a first registration process of storing the terminal identifying information in the memory as corresponding information, the terminal identifying information being associated, in the corresponding information, with the first user identification information included in the first authentication information;
in response to receiving the terminal identifying information through the second communication interface while being in the logged-out state, a second authentication process of performing authentication by collating the terminal identifying information and the corresponding information stored in the memory, the second authentication process determining that the authentication is successfully done when the terminal identifying information is included in the received terminal identifying information; and
in response to determining that the authentication is successfully done in the second authentication process, a second login process of switching the state of the image processing apparatus from the logged-out state to the logged-in state.

18. The non-transitory computer-readable medium according to claim 17,
wherein the memory stores a second database in which the first user identification information, the terminal identifying information and availability information of each of at least one image processing operation are associated with each other, wherein the instructions causes, when executed, the controller to:

when the execution instruction of the image processing operation is input through the user interface, receive, from the second database, the availability information of the image processing operation corresponding to the first user identification information of a user who inputs the execution instruction and of which the execution instruction is input;

execute the image processing operation when the availability information indicating that the image processing operation is available, and not execute the image processing operation when the availability information indicating that the image processing operation is unavailable; and in the first registration process, store the corresponding information in the second database as the first user identification information and the terminal identifying information and store the availability information, which indicates that the image processing operation is available, corresponding to the first user identification information.

19. The non-transitory computer-readable medium according to claim 18, wherein the instructions causes, when executed, the controller to:

perform authentication in one of a first authentication mode using the first database and a second authentication mode using the second database; and switch an authentication mode of the authentication between the first authentication mode and the second authentication mode in accordance with an operation input through the user interface.

20. The non-transitory computer-readable medium according to claim 19, wherein the instructions causes, when executed, the controller to delete information stored in the second database in response to switching the authentication mode from the second authentication mode to the first authentication mode.

* * * * *

UNITED STATES PATENT AND TRADEMARK OFFICE
CERTIFICATE OF CORRECTION

| | | |
|---|---|---|
| PATENT NO. | : 10,466,943 B2 | Page 1 of 1 |
| APPLICATION NO. | : 16/215718 | |
| DATED | : November 5, 2019 | |
| INVENTOR(S) | : Liu | |

It is certified that error appears in the above-identified patent and that said Letters Patent is hereby corrected as shown below:

In the Claims

Column 21, Claim 8, Line 4 should read:
a receiving process of receiving, from the authentication Signed and Sealed this
Nineteenth Day of January, 2021

Andrei Iancu
*Director of the United States Patent and Trademark Office*